US011934692B2

United States Patent
Porzio et al.

(10) Patent No.: US 11,934,692 B2
(45) Date of Patent: Mar. 19, 2024

(54) WRITE BOOSTER BUFFER AND HIBERNATE

(71) Applicant: Micron Technology, Inc., Boise, ID (US)

(72) Inventors: Luca Porzio, Casalnuovo (IT); Deping He, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 87 days.

(21) Appl. No.: 17/645,265

(22) Filed: Dec. 20, 2021

(65) Prior Publication Data
US 2023/0195370 A1 Jun. 22, 2023

(51) Int. Cl.
*G06F 3/06* (2006.01)

(52) U.S. Cl.
CPC .......... *G06F 3/0656* (2013.01); *G06F 3/0604* (2013.01); *G06F 3/0634* (2013.01); *G06F 3/0653* (2013.01); *G06F 3/0659* (2013.01); *G06F 3/0679* (2013.01)

(58) Field of Classification Search
CPC .... G06F 3/0656; G06F 3/0659; G06F 3/0604; G06F 3/0634; G06F 3/0679; G06F 3/0653
See application file for complete search history.

(56) References Cited

U.S. PATENT DOCUMENTS

| | | | | |
|---|---|---|---|---|
| 9,449,702 | B1* | 9/2016 | Pinkovich | G01R 21/06 |
| 2018/0129424 | A1* | 5/2018 | Confalonieri | G06F 3/061 |
| 2022/0300185 | A1* | 9/2022 | Amaki | G06F 3/0652 |
| 2022/0374172 | A1* | 11/2022 | Kim | G06F 3/0679 |

* cited by examiner

*Primary Examiner* — Mark A Giardino, Jr.
(74) *Attorney, Agent, or Firm* — Holland & Hart LLP

(57) ABSTRACT

Methods, systems, and devices for write booster buffer and hibernate are described. The memory system may initiate a first operation to enter a first power mode having a lower power consumption than a second power mode. In some cases, the memory system may determine whether a quantity of data stored in a buffer of single-level cells associated with write booster information satisfies a threshold based on initiating the first operation. The memory system may determine whether to perform a second operation to transfer the quantity of data stored in the buffer of single-level cells to a portion of memory comprising multiple level cells based on determining whether the quantity of data satisfies the threshold. The memory system may enter the first power mode based on determining to perform the second operation to transfer the quantity of data from the buffer to the portion of memory.

22 Claims, 5 Drawing Sheets

WRITE BOOSTER BUFFER AND HIBERNATE

FIELD OF TECHNOLOGY

The following relates generally to one or more systems for memory and more specifically to write booster buffer and hibernate.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
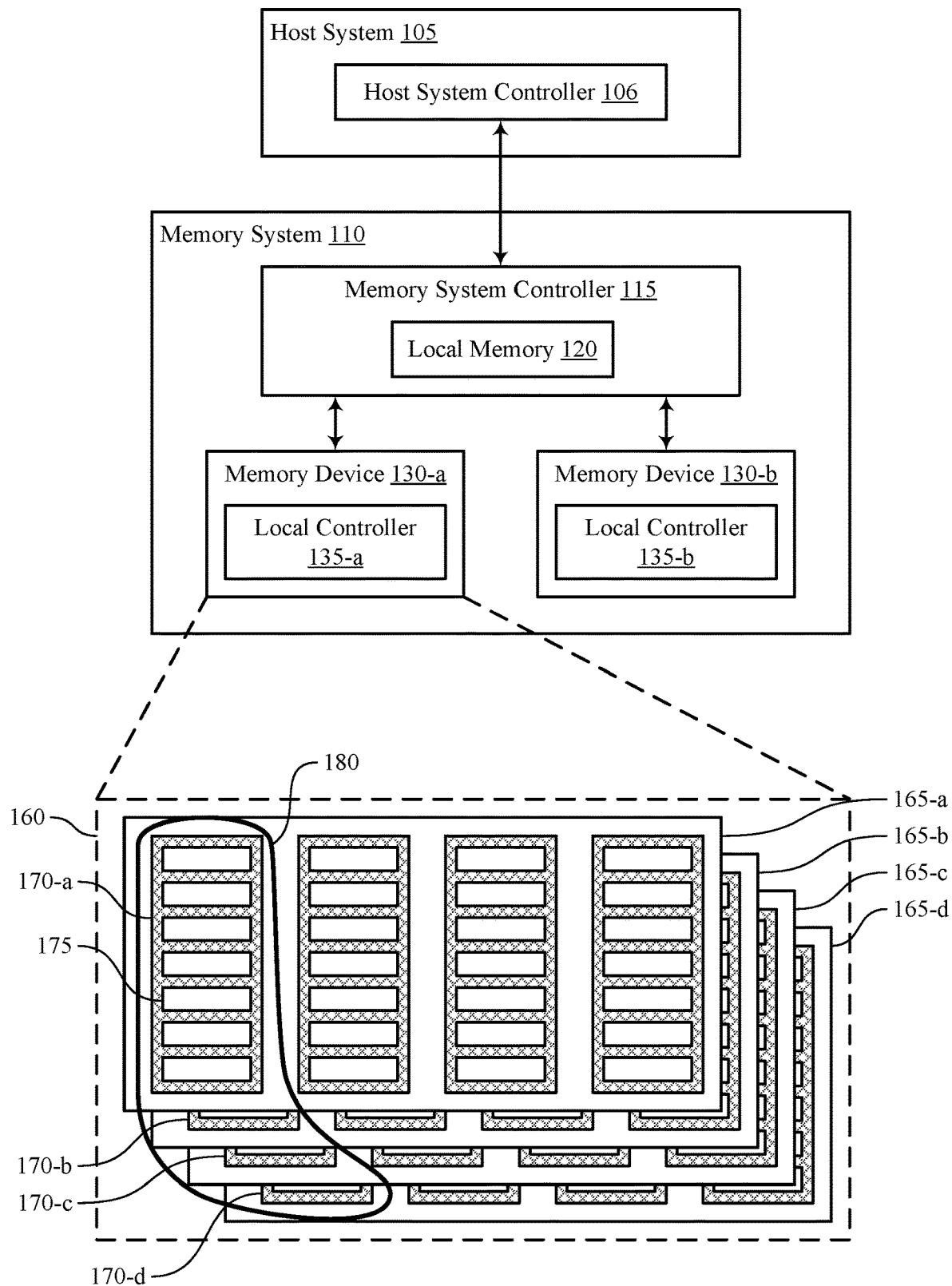
FIG. 1 illustrates an example of a system that supports write booster buffer and hibernate in accordance with examples as disclosed herein.

Some memory systems may include a write booster mode. The write booster mode may allow the memory system to write information faster than a normal mode (e.g., a non-write booster mode). During the write booster mode, the memory system may write data to the single-level cell (SLC) portion of memory and then move the data to the tri-level cell (TLC) portion of memory at a later time as part of a background operation. In some cases, the SLC portion of memory may be an example of a write booster buffer. During the normal mode, the memory system may write data directly into the TLC portion of memory which may take more time than writing to the SLC portion of memory. In some cases, the memory system may enter a hibernate mode (e.g., a lower power mode). Prior to entering the hibernate mode, the memory system may empty the write booster buffer by folding the contents of the write booster buffer into TLC blocks. If the data in the write booster buffer is overwritten, the contents folded into the TLC blocks may be invalid, thereby increasing a quantity of programming operations and programming cycles performed, but without larger benefits.

In some cases, it may be desirable to improve the operations of the memory system by decreasing the power consumption of the overall system and increase efficiency of the memory system. Overwriting the data of the write booster buffer and invalidating the contents folded into TLC blocks may result in the memory system experiencing a performance loss, increased signaling overhead, and increased processing overhead for performing operations. For example, the memory system may be writing invalid data from the write booster buffer to TLC blocks before entering a hibernate mode. Such operations may not be useful and may incur costs at the memory system. In such cases, emptying the write booster buffer regardless of a quantity of data stored in the write booster buffer may decrease performance of the memory system, increase power consumption, or the like.

Systems, devices, and techniques are described for a memory system to determine whether to empty the write booster buffer based on a quantity of data stored in the write booster buffer and, in some cases, an endurance parameter associated with the memory system. In some cases, systems, devices, and techniques are described for the memory system to perform techniques for monitoring the write booster buffer based on a total bytes written (TBW) of the memory system. In such cases, if the TBW of the memory system satisfies a threshold, the memory system may refrain from flushing (e.g., emptying) the contents of the write booster buffer into the TLC portion of memory until the write booster buffer satisfies a fill threshold. For example, if the quantity of data in the write booster buffer is below a threshold, the memory system may refrain from flushing the contents of the write booster buffer into the TLC portion of memory. If the quantity of data in the write booster buffer is above the threshold, the memory system may flush the contents of the write booster buffer prior to entering the hibernate mode. In some cases, the memory system may modify the write booster fill threshold to improve the performance of operating in the write booster mode and entering the hibernate mode. For example, the memory system may monitor the fullness-level of write booster buffer and adjust (e.g., lower) the write booster fill threshold, thereby delaying the flush operation and limiting the impact on the write booster performance.

Determining whether the TBW of the memory system satisfies the threshold and determining whether the quantity of data in the write booster buffer satisfies the threshold prior to performing the flush operation may increase performance of the memory system by reducing a quantity of write operations that include data that may be less useful. Performing the flush operation prior to entering the hibernate mode may reduce a quantity of write booster data that may be overwritten and contents that may be invalidated, thereby reducing the power consumption and allowing for more efficient and faster device procedures. Such techniques may increase the performance of the memory system experiencing improved read speeds, reduced power consumption, decreased processing complexity, and improved processing times.

Features of the disclosure are initially described in the context of a system with reference to FIG. 1. Features of the disclosure are described in the context of a system and flow diagram with reference to FIGS. 2-3. These and other features of the disclosure are further illustrated by and described in the context of an apparatus diagram and a flowchart that relate to write booster buffer and hibernate with reference to FIGS. 4-5.

FIG. 1 illustrates an example of a system 100 that supports write booster buffer and hibernate in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105).

Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally or alternatively, a NAND memory device 130 may include memory cells configured to each store multiple bits of information, which may be referred to as multi-level cells (MLCs) if configured to each store two bits of information, as TLCs if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support write booster buffer and hibernate. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, the system 100 may implement techniques to manage the write booster buffer when the TBW of the memory system satisfies a threshold. The system 100 may initiate a first operation to enter a first power mode (e.g., hibernate mode) having a lower power consumption than a second power mode. In some examples, the system 100 may determine whether a TBW to the memory system 110 satisfies a threshold in response to initiating the first operation. In some cases, the system 100 may determine whether a quantity of data stored in a buffer (e.g., write booster buffer) of SLCs associated with write booster information satisfies a threshold in response to initiating the first operation. In such cases, the system 100 may determine whether a fill level of the write booster buffer satisfies the threshold.

The system 100 may determine whether to perform a second operation (e.g., flush operation) to transfer the quantity of data stored in the buffer of SLCs to a portion of memory including multiple level cells in response to determining whether the quantity of data satisfies the threshold. For example, the system 100 may determine that the TBW satisfies the threshold and the quantity of data satisfies the threshold. In such cases, the system 100 may determine to perform the second operation in response to the determinations. The system 100 may enter the first power mode in response to performing the second operation to transfer the quantity of data from the buffer to the portion of memory.

Figure 2:
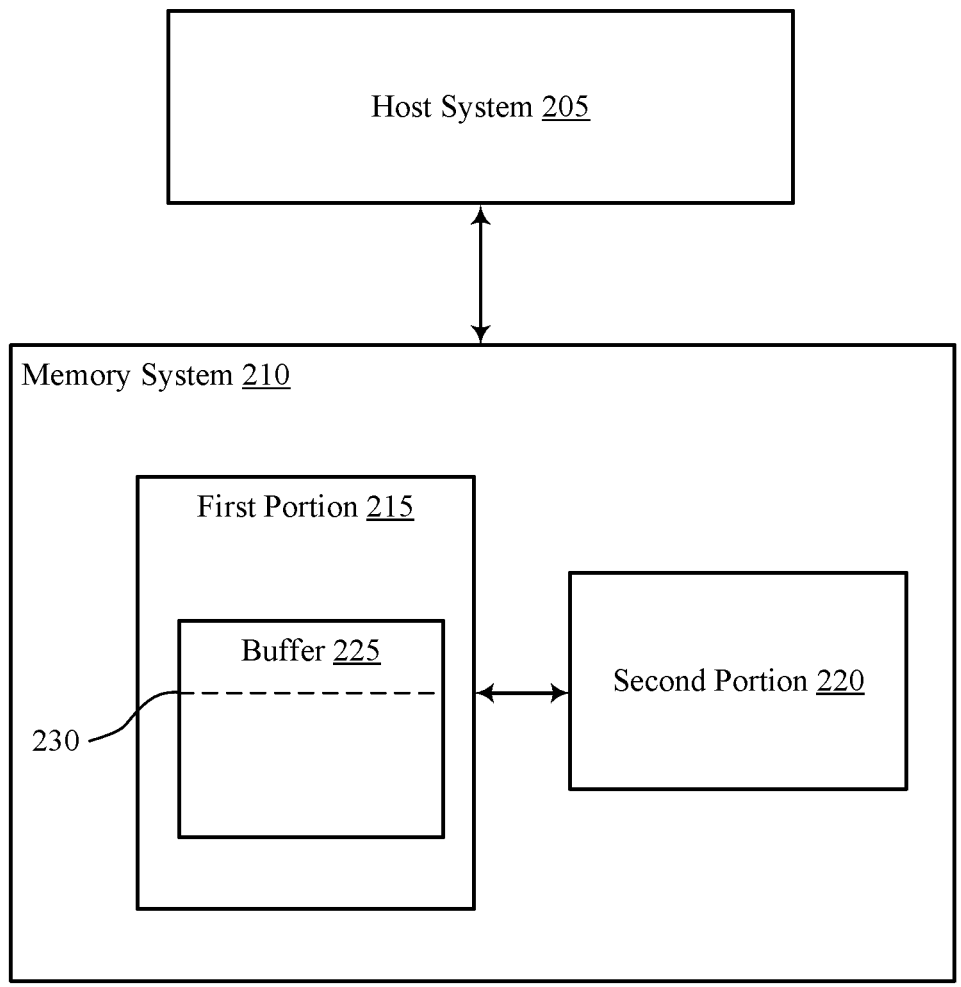
FIG. 2 illustrates an example of a system that supports write booster buffer and hibernate in accordance with examples as disclosed herein.

FIG. 2 illustrates an example of a system 200 that supports write booster buffer and hibernate in accordance with examples as disclosed herein. The system 200 may include a host system 205 and a memory system 210, which may be examples of the corresponding devices described with respect to FIG. 1.

The memory system may include a first portion 215 and a second portion 220. The first portion 215 may be an example of the SLC portion of memory. In some cases, a NAND memory system 210 may include memory cells configured to each store one bit of information, which may be referred to as SLCs. The second portion 220 may be an example of a portion of memory comprising multiple level cells. The multiple level cells may include multi-level cells (e.g., MLC) configured to store two bits of data, triple-level cell (e.g., TLC) configured to store three bits of data, or quad-level cells (e.g., QLC) configured to store four bits of data. In such cases, the second portion 220 may be an example of the TLC portion of memory or QLC portion of memory.

For example, a NAND memory system 210 may include memory cells configured to each store multiple bits of information, which may be referred to as MLCs if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins, greater complexities for supporting circuitry, and increased times for reading data and writing data.

The first portion 215 may include a buffer 225. The buffer 225 may be an example of the write booster buffer. In such cases, the buffer 225 may be an example of a buffer of SLCs associated with write booster information. For example, the buffer 225 may be an example of a SLC portion of memory that may include SLC blocks dedicated for the write booster mode. Operating in write booster mode may include writing data initially to the SLC portion of memory (e.g., first portion 215) and then moving data to the TLC portion of memory (e.g., second portion 220) as part of background operations. In such cases, the memory system 210 may receive a command from the host system 205 that instructs the memory system 210 to write the data into a specific buffer (e.g., buffer 225) for faster performance.

For example, the host system 205 may send a write boost write command to the memory system 210. The memory system 210 may receive the write boost write command and initiate the write booster mode. The memory system 210 may activate a write booster mode in response to receiving the write booster command. In some cases, the memory system 210 may configure sections of blocks of data (e.g., NAND memory cells) to be written to using the write booster mode. For example, the memory system 210 may write data to the SLC portion of memory which may allow the memory system 210 to write information faster than writing to the TLC portion. During the write booster mode, the memory system 210 may begin to fill (e.g., store) data in the buffer 225 (e.g., SLC portion of memory). Writing data into SLC portions of memory may take less time than writing to TLC portions of memory.

In some cases, the memory system 210 may operate in a non-tracking mode. The non-tracking mode may be configured to perform a flush operation before entering a hibernate mode regardless of an amount of data stored in the buffer 225. In such cases, the host system 205 may transmit a request, to the memory system 210, to perform a flush operation. The memory system 210 may flush the buffer 225 in direct response to receiving the request and empty the contents of the buffer 225. In other examples, the host system 205 may set a flag that indicates to operation in a flush during hibernate mode. In such cases, the memory system 210 may flush the buffer 225 in response to identifying that the flag is set and empty the contents of the buffer 225. In some cases, the memory system may empty (e.g., flush) the buffer 225 in direct response to receiving the request to perform the flush operation and/or identifying that the flag is set. For example, the memory system 210 may remove the data from the buffer 225 prior to entering a hibernate mode.

The hibernate mode may be an example a low power mode. During hibernate mode or before entering hibernate mode, the memory system 210 may perform background operations. The flush operation may be an example of moving data from the buffer 225 of the first portion 215 to the second portion 220 (e.g., TLC portion of memory). In such cases, the memory system 210 may empty the contents of the buffer 225 during the flush operation. In some examples, the memory system 210 may empty the contents of the buffer 225 until the buffer 225 is empty (e.g., does not include data) based on the flush during hibernate mode flag being set and/or the memory system 210 operating in a non-tracking mode. In other examples, the memory system 210 may empty the contents of the buffer 225 until the buffer 225 reaches the threshold 230, as described herein. For example, the memory system may activate a tracking mode to determine whether to perform the flush operation before entering the first hibernate mode.

In some systems, the memory system 210 may empty the buffer 225 until the buffer 225 is completely empty (e.g., 0% full or 100% empty). If the memory system enters hibernate mode multiple instances over a duration, there is a possibility that data in write booster buffer may be transferred to TLC blocks multiple times, even invalid data in the write booster buffer may be transferred multiple times. In such cases, the new data in the TLC blocks may be marked as invalid, but not until after the data is transferred. In such cases, transferring the write booster information (e.g., data stored in the buffer 225) and then immediately invalidating some of the data may increase a quantity of NAND programming operations and increase consumption of NAND program/erase (PE) cycles. The memory system 210 may refrain from folding the invalidated data into the TLC blocks by delaying the folding procedure. If the memory system 210 delays the folding procedure, the memory system 210 may overwrite (e.g., invalidate) a portion of the written data. As the duration of the delay increases, the memory system 210 may perform an increased quantity of flush operations to transfer the data in the buffer 225 to other blocks, thereby increasing the overhead and decreasing the processing times.

To address these deficiencies, the memory system 210 may delay flushing the buffer 225 until a threshold 230 of the buffer 225 is satisfied. For example, the memory system 210 may determine whether a quantity of data stored in a buffer of SLCs associated with write booster information satisfies the threshold 230. In such cases, the threshold 230 may be an example of a fullness level of the buffer 225. For example, the threshold 230 may indicate a value of a quantity of data stored in the buffer 225. In some cases, the threshold 230 may be an example of percentage of available space of the buffer 225.

In some cases, the contents of the buffer 225 may exceed the threshold 230. In such cases, the memory system 210 may determine that the contents of the buffer 225 exceed the threshold and perform a flush operation until the contents of the buffer 225 are less than or equal to the threshold 230. In other examples, the memory system 210 may set a parameter to ignore host indications to flush during the hibernate mode until the buffer 225 is filled up to a value of the threshold 230. In some examples, the memory system 210 may set a parameter to ignore host indications to flush during the hibernate mode until the buffer 225 is filled up to a percentage of available space of the buffer 225 (e.g., threshold 230). In response to the memory system 210 determining that the buffer 225 is filled up to the threshold 230, the memory system 210 may perform the flush operation. Alternatively, in response to the memory system 210 determining that the buffer 225 is not filled up to the threshold 230, the memory system 210 may refrain from performing the flush operation.

Performing the flush operation may be an example of emptying the contents of the buffer 225. In some examples, the memory system 210 may transfer data from the buffer 225 of the first portion 215 to the second portion 220 during the flush operation. In such cases, the memory system 210 may keep the hot contents (e.g., most recently written data) in the buffer 225 and refrain from transferring the hot contents to the second portion 220.

In some cases, the threshold 230 may be an example of a percentage of unavailable (e.g., written) space of the buffer 225. In one example, the memory system 210 may set the threshold 230 to be 30% of filled space. In such cases, the memory system 210 may empty the data of the buffer until the threshold 230 is reached. For example, the memory system 210 may empty the buffer 225 down to the threshold 230 such that the buffer 225 may include at least 30% filled space (e.g., stored data). The memory system 210 may keep at least 30% of the buffer 225 with stored data in case the next write operation overwrites the contents of the buffer 225.

In some cases, it may be desirable to employ these write booster buffer flushing techniques as the memory system ages. When the memory system is relatively new, the memory system may prioritize performance and may flush the write booster buffer to TLC blocks every time a hibernate mode is entered. As the memory system gets older, the memory system may want to limit the quantity of write operations. As such, the memory system 210 may determine whether a TBW to the memory system 210 satisfies a second threshold different than threshold 230 and then begin implementing these techniques when the TBW satisfies a threshold. In some cases, the threshold may be an example of a quantity of TBW. For example, the memory system 210 may set a parameter to ignore host indications to flush during the hibernate mode until the buffer 225 is filled up to the threshold 230 that indicates the TBW. In some cases, the TBW may represent an amount of data that a host system 205 may write to the memory system 210. For example, the host system 205 may issue write commands or read commands to access the memory system 210. Management operations may be performed at the same time as the host-initiated operations (e.g., host-initiated write operations) are performed. Such procedures may result in an increased amount of TBW as more data may be written or read in the memory system 210 than what was requested by the host system 205.

In some cases, the memory system 210 may determine that the TBW fails to satisfy the threshold 230 (e.g., is below the threshold 230). In such cases, the memory system 210 may empty (e.g., flush) the contents of the buffer 225 such that the buffer 225 may not include any stored data (e.g., 0% full). In some cases, the memory system 210 may refrain from performing the flush operation in direct response to determining that the TBW fails to satisfy the threshold 230. In other examples, the memory system 210 may determine that the TBW satisfies (e.g., exceeds) the threshold 230. In such cases, the memory system 210 may flush the contents of the buffer 225 down to the threshold 230.

The contents of the buffer 225 may be emptied such that after the memory system 210 exits the hibernate mode, the memory system 210 may be able to utilize the entire space of the buffer 225 during the next active session to accept write booster commands from the host system 205, thereby improving the performance of the memory system 210. The write booster mode may increase performance of the write operation. The performance of the memory system 210 may decrease due to the fullness of the buffer 225. In such cases, the memory system 210 may adjust the threshold 230 of the buffer 225 based on the activity of the memory system 210.

The memory system 210 may monitor the fullness level of the buffer 225. In some examples, the memory system 210 may monitor the threshold 230 of the buffer 225. The memory system 210 may determine that the buffer 225 is full (e.g., is 100% full), and the write traffic for the write booster mode may be slowed in response to determining that the buffer 225 is full. In such cases, the memory system 210 may adjust the threshold 230. For example, the memory system 210 may decrease the threshold 230. In some examples, the memory system 210 may decrease the threshold 230 by increments of one percent or one nominal value. The memory system 210 may continue to decrease the threshold 230 by increments of 1% each occurrence that the buffer 225 is filled to 100% full. By using the automatic adjustment factor, the memory system 210 may lower the threshold 230 and determine a threshold 230 between delaying the flush operation and limiting the impact on the write booster performance.

In some cases, the memory system 210 may identify incoming data to be stored in the buffer 225. The memory system 210 may monitor the fill level of the buffer 225 (e.g., threshold 230) and determine that the buffer 225 may be unable to store the incoming data. For example, the memory system 210 may determine that the buffer 225 is full. In such cases, the memory system 210 may lower the fill threshold size (e.g., threshold 230) until the buffer 225 may be able to store the incoming data.

For example, the host system 205 may transmit a write command to the memory system 210. The memory system 210 may identify the incoming write command and determine that the buffer 225 is full (e.g., includes no available space to store the incoming write command). In such cases, the memory system 210 may automatically lower the threshold 230. For example, the memory system 210 may estimate the desired threshold 230 based on usage patterns of the memory system 210 and correct (e.g., lower) the threshold 230 until the desired threshold 230 is met.

In some cases, the memory system 210 may determine an amount of the buffer 225 that that the memory system 210 utilizes in a day or other duration of time. For example, the memory system 210 may determine an amount of the buffer 225 that is filled at the end of the day. In one example, the memory system 210 may determine that 50% of the buffer 225 may be used at the end of the day. In such cases, the memory system 210 may set the threshold 230 to be 50% full (e.g., unavailable space that is used to store data). The memory system 210 may determine for the following day that 40% of the buffer 225 may be used. In such cases, the memory system 210 may adjust (e.g., lower) the threshold to be 40% full.

In some cases, determining whether the TBW satisfies the threshold and determining whether the quantity of data satisfies the threshold prior to performing the flush operation may increase the TBW by preventing folded data from being invalidated. In some examples, the system 200 may reduce power consumption by reducing a quantity of write booster folding procedures. Waiting to perform the flush operation until the threshold 230 is reached may extend the write booster performance and capability to increase a lifetime of the memory system 210 by offering increased performance and increased write booster alignment.

Figure 3:
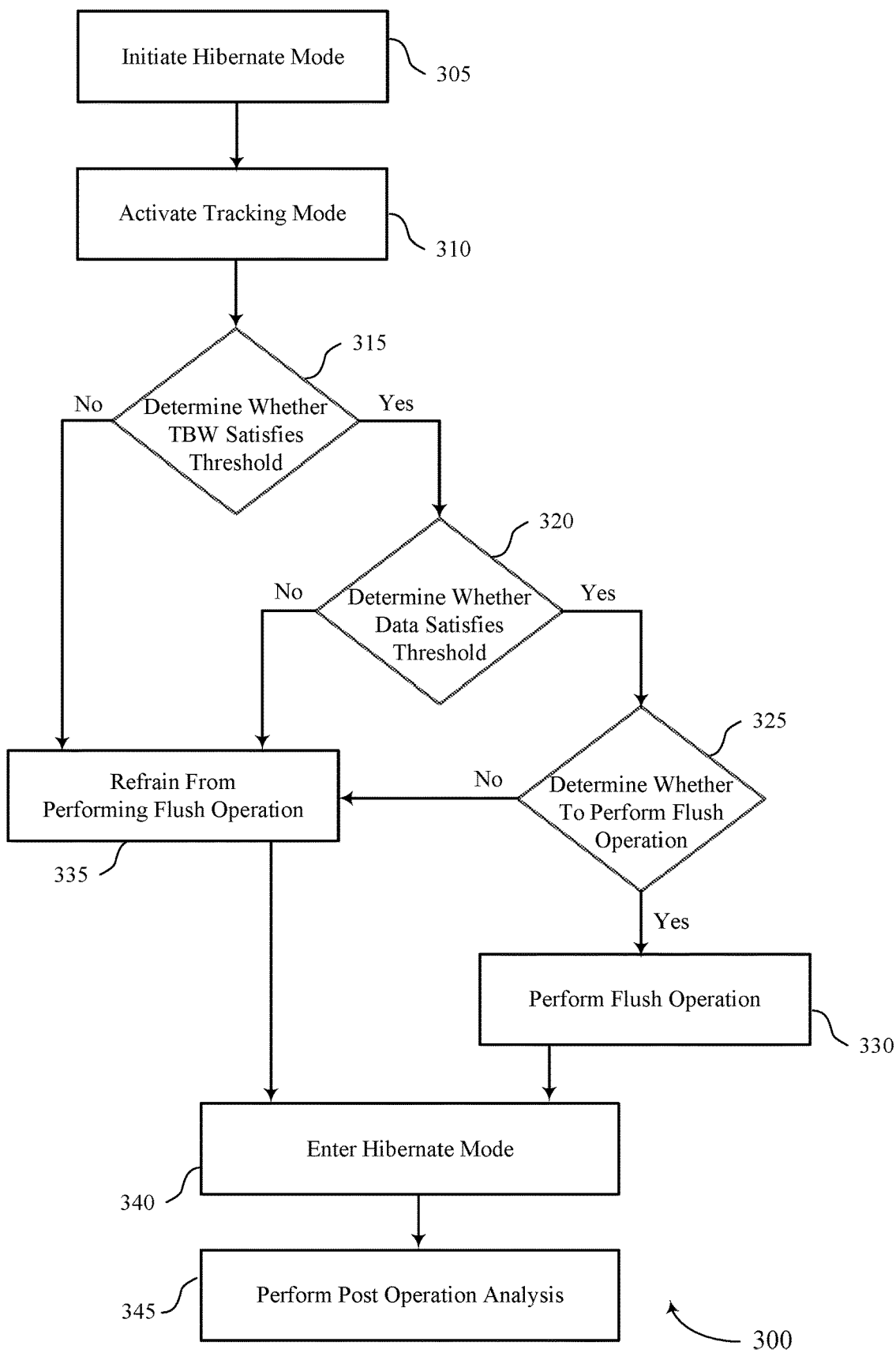
FIG. 3 illustrates an example of a flow diagram that supports write booster buffer and hibernate in accordance with examples as disclosed herein.

FIG. 3 illustrates an example of a flow diagram 300 that supports write booster buffer and hibernate in accordance with examples as disclosed herein. The flow diagram 300 may include a host system 305 and a memory system 310. The host system 305 and the memory system 310 may be examples of the corresponding devices described with respect to FIGS. 1 and 2. Alternative examples of the following may be implemented, where some steps are performed in a different order than described or not performed at all. In some cases, steps may include additional features not mentioned below, or further steps may be added.

Aspects of the flow diagram 300 may be implemented by a controller, among other components. Additionally or alternatively, aspects of the flow diagram 300 may be implemented as instructions stored in memory (e.g., firmware stored in a memory coupled with controller). For example, the instructions, when executed by a controller, may cause the controller to perform the operations of the flow diagram 300.

At 305, a hibernate mode may be initiated. For example, the memory system may initiate, at the memory system, a first operation to enter a first power mode having a lower power consumption than a second power mode. In some cases, the first power mode may be an example of the hibernate mode, a low power mode, a sleep mode, or a combination thereof. The second power mode may be an example of an active mode, a high power mode, an access mode, or a combination thereof.

The memory system may identify a request to perform a flush operation (e.g., second operation) associated with the memory system in response to initiating the first operation to enter the first power mode. For example, the memory system may receive a request to perform a flush operation in direct response to initiating an operation to enter the hibernate mode. In some cases, the request may not be received by the memory system but rather the request may be internally generated. In such cases, the memory system may generate the request to perform the flush operation.

At 310, tracking mode may be activated. For example, the memory system may activate a tracking mode to determine whether to perform the flush operation (e.g., second operation) before entering the hibernate mode (e.g., first power mode). The tracking mode may be an example of performing a flush operation until a percentage of available space of the buffer satisfies a threshold. In some cases, the memory system may activate a manually controlled threshold technique in which the memory system sets a threshold of the buffer to perform the flush operation until the threshold is reached. In such cases, the threshold may be greater than or equal to zero. A non-tracking mode may be an example of performing a flush operation until the buffer is empty. In such cases, the threshold may be zero. In some cases, the tracking mode may be entered before initiating the hibernate mode.

At 315, a determination may be made whether the TBW satisfies a threshold. For example, the memory system may determine whether a TBW to the memory system satisfies a threshold. In some examples, the memory system may determine whether a TBW to the memory system satisfies a threshold based on activating the track mode and/or initiating the hibernate mode.

In some cases, the memory system may determine that the TBW fails to satisfy the threshold. In such cases, at 335, performing the flush operation may be refrained. For example, the memory system may refrain from performing the flush operation in response to determining that the TBW fails to satisfy the threshold. In some cases, entering the hibernate mode (e.g., first power mode) may occur without performing the flush operation (e.g., second operation) in direct response to determining that the TBW fails to satisfy the threshold and determining to refrain from performing the flush operation. In such cases, the memory system may refrain from performing the flush operation if the TBW fails to satisfy the threshold.

In some examples, the memory system may determine that the TBW satisfies the threshold. In such cases, at 320, a determination may be made whether the data satisfies a threshold. For example, the memory system may determine whether a quantity of data stored in a buffer of SLCs associated with write booster information satisfies a threshold based on initiating the first operation to enter the first power mode. In such cases, the memory system may determine whether the write buffer fill satisfies a threshold.

In some cases, determining whether the quantity of data satisfies the threshold may be based on activating the tracking mode. In some examples, determining whether the quantity of data satisfies the threshold may be in direct response to determining whether the TBW satisfies the threshold. For example, if the TBW satisfies the threshold, the memory system may check the write buffer fill threshold. The memory system may determine whether a percentage of available space of the buffer satisfies the threshold after initiating the hibernate mode. For example, the memory system may determine whether a fullness level of the write booster buffer satisfies the threshold. In some cases, the memory system may determine whether a quantity of space that the write booster buffer uses to store data satisfies the threshold. The quantity of data may be an example of a nominal a value of data, a percentage of a total amount of data, or a combination thereof. The memory system may determine whether the write booster buffer size satisfies a threshold. In some cases, the memory system may determine whether write traffic is slowed.

The memory system may determine that the amount of data fails to satisfy threshold. In some cases, the memory system may determine that a percentage of available space of the buffer fails to satisfy the threshold in response to determining that the TBW satisfies the threshold. In such cases, at 335, performing the flush operation may be refrained. For example, the memory system may refrain from performing the flush operation in response to determining that the quantity of fails to satisfy the threshold. In some cases, entering the hibernate mode may occur without performing the flush operation after determining that the quantity of fails to satisfy the threshold and determining to refrain from performing the flush operation. In such cases, the memory system may refrain from performing the flush operation if the quantity of data fails to satisfy the threshold.

The memory system may determine that the quantity of data satisfies the threshold in response to determining that the TBW satisfies the threshold. In some case, the memory system may determine that a percentage of available space of the buffer satisfies the threshold after initiating the hibernate mode. The memory system may determine that the write booster buffer size satisfies threshold. In some cases, the memory system may determine that the write traffic is slowed.

At 325, a determination may be made whether to perform the flush operation. For example, the memory system may determine whether to perform a flush operation (e.g., second operation) to transfer the quantity of data stored in the buffer of SLCs to a portion of memory comprising multiple level cells in direct response to determining that the quantity of data satisfies the threshold. The multiple level cells may be an example of multi-level cells configured to store two bits of data, triple-level cell configured to store three bits of data, or quad-level cells configured to store four bits of data. In such cases, the memory system may include SLC, TLC, QLC, or a combination thereof. In some case, determining whether to perform the flush operation may be based on activating the tracking mode.

In some cases, the memory system may determine to refrain from performing the flush operation at 335. In other examples, at 330, a flush operation may be performed. For example, the memory system may perform the flush operation in response to determining that the quantity of data satisfies the threshold and/or determining to perform the flush operation. In such cases, the memory system may perform the flush operation if the write buffer fill (e.g., quantity of data in the write buffer) satisfies the threshold.

Performing the flush operation may be an example of refraining from transferring data that was last written to before the memory system entered the hibernate mode. In such cases, the memory system may refrain from transferring data that was last written to before the memory system entered the hibernate mode in response to determining that the quantity of data satisfies the threshold and/or determining to perform the flush operation. For example, the memory system may keep hot contents in the write booster buffer (e.g., refrain from transferring the hot contents). In such cases, the most recently written block of data may not be flushed.

In some cases, performing the flush operation may be an example of transferring data from a SLC cache to a TLC cache. The memory system may transfer data from the SLC cache to the TLC cache in response to determining that the amount of data satisfies the threshold and/or determining that the percentage satisfies the threshold. In some case, the flush operation may be performed until the quantity of data equals the threshold. For example, the memory system may empty the memory system down to the threshold.

At 340, the hibernate mode may be entered. For example, the memory system may enter the hibernate mode in direct response to determining to perform the flush operation to transfer the quantity of data from the buffer to the portion of memory. In such cases, the memory system may enter hibernate mode after performing the flush operation. In some examples, the memory system may enter the hibernate mode after refraining from performing the flush operation. In such case, the memory system may enter the hibernate mode without performing the flush operation.

At 345, a post operation analysis may be performed. For example, the memory system may check a fill threshold and after completing the hibernate mode, the memory system may perform a post operation analysis. The post operation analysis may include determining a quantity of times that the memory system performs the flush operation. If the quantity of times that the memory system performs the flush operation is equal to or above a threshold, the memory system may adjust the threshold.

For example, the memory system may adjust the threshold in direct response to determining that the percentage of the available space of the buffer is below a threshold. In such cases, the memory system may lower the write booster fill threshold if the write booster buffer is full. For example, the memory system may decrease the write booster fill threshold in increments of one nominal value, one percent, or other increments of values and/or percentages. In some examples, the memory system may determine a threshold after activating the tracking mode (e.g., learning mode) to automatically control the threshold. In such cases, the threshold may be adjusted based on current use statistics, prior use statics on the write buffer, or both.

Figure 4:
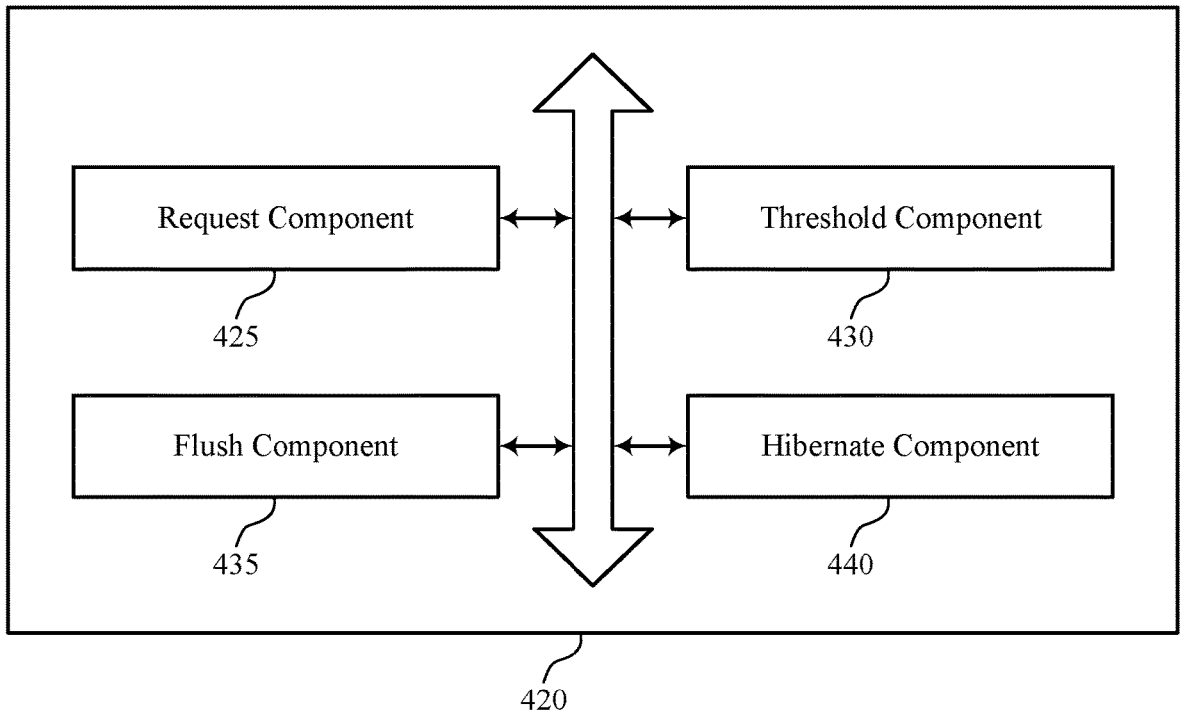
FIG. 4 shows a block diagram of a memory system that supports write booster buffer and hibernate in accordance with examples as disclosed herein.

FIG. 4 shows a block diagram 400 of a memory system 420 that supports write booster buffer and hibernate in accordance with examples as disclosed herein. The memory system 420 may be an example of aspects of a memory system as described with reference to FIGS. 1 through 3. The memory system 420, or various components thereof, may be an example of means for performing various aspects of write booster buffer and hibernate as described herein. For example, the memory system 420 may include a request component 425, a threshold component 430, a flush component 435, a hibernate component 440, or any combination thereof. Each of these components may communicate, directly or indirectly, with one another (e.g., via one or more buses).

The request component 425 may be configured as or otherwise support a means for initiating, at a memory system, a first operation to enter a first power mode having a lower power consumption than a second power mode. The threshold component 430 may be configured as or otherwise support a means for determining whether a quantity of data stored in a buffer of single-level cells associated with write booster information satisfies a threshold based at least in part on initiating the first operation to enter the first power mode. The flush component 435 may be configured as or otherwise support a means for determining whether to perform a second operation to transfer the quantity of data stored in the buffer of single-level cells to a portion of memory including multiple level cells based at least in part on determining whether the quantity of data satisfies the threshold. The hibernate component 440 may be configured as or otherwise support a means for entering the first power mode based at least in part on determining to perform the second operation to transfer the quantity of data from the buffer to the portion of memory.

In some examples, the flush component 435 may be configured as or otherwise support a means for performing the second operation based at least in part on determining that the quantity of data satisfies the threshold and determining to perform the second operation, where entering the first power mode is based at least in part on performing the second operation.

In some examples, entering the first power mode occurs without performing the second operation based at least in part on determining that the quantity of data fails to satisfy the threshold and determining to refrain from performing the second operation.

In some examples, the threshold component 430 may be configured as or otherwise support a means for determining whether a total bytes written to the memory system satisfies a second threshold, where determining whether the quantity of data satisfies the threshold is based at least in part on determining whether the total bytes written satisfies the second threshold.

In some examples, the hibernate component 440 may be configured as or otherwise support a means for activating, at the memory system, a tracking mode to determine whether to perform the second operation before entering the first power mode, where determining that the quantity of data satisfies the threshold and determining to perform the second operation is based at least in part on activating the tracking mode.

In some examples, to support determining whether the quantity of data satisfies the threshold, the threshold component 430 may be configured as or otherwise support a means for determining that a percentage of available space of the buffer satisfies the threshold after the initiating occurs.

In some examples, the threshold component 430 may be configured as or otherwise support a means for adjusting the threshold based at least in part on determining that the percentage of the available space of the buffer is below a second threshold.

In some examples, the flush component 435 may be configured as or otherwise support a means for identifying a request to perform a flush operation associated with the memory system based at least in part on initiating the first operation to enter the first power mode.

In some examples, the flush component 435 may be configured as or otherwise support a means for refraining from transferring data that was last written to before the memory system entered the first power mode based at least in part on determining that the quantity of data satisfies the threshold.

In some examples, the second operation is performed until the quantity of data equals the threshold. In some examples, the first power mode includes a hibernate mode. In some examples, the multiple level cells include multi-level cells configured to store two bits of data, triple-level cell configured to store three bits of data, or quad-level cells configured to store four bits of data.

Figure 5:
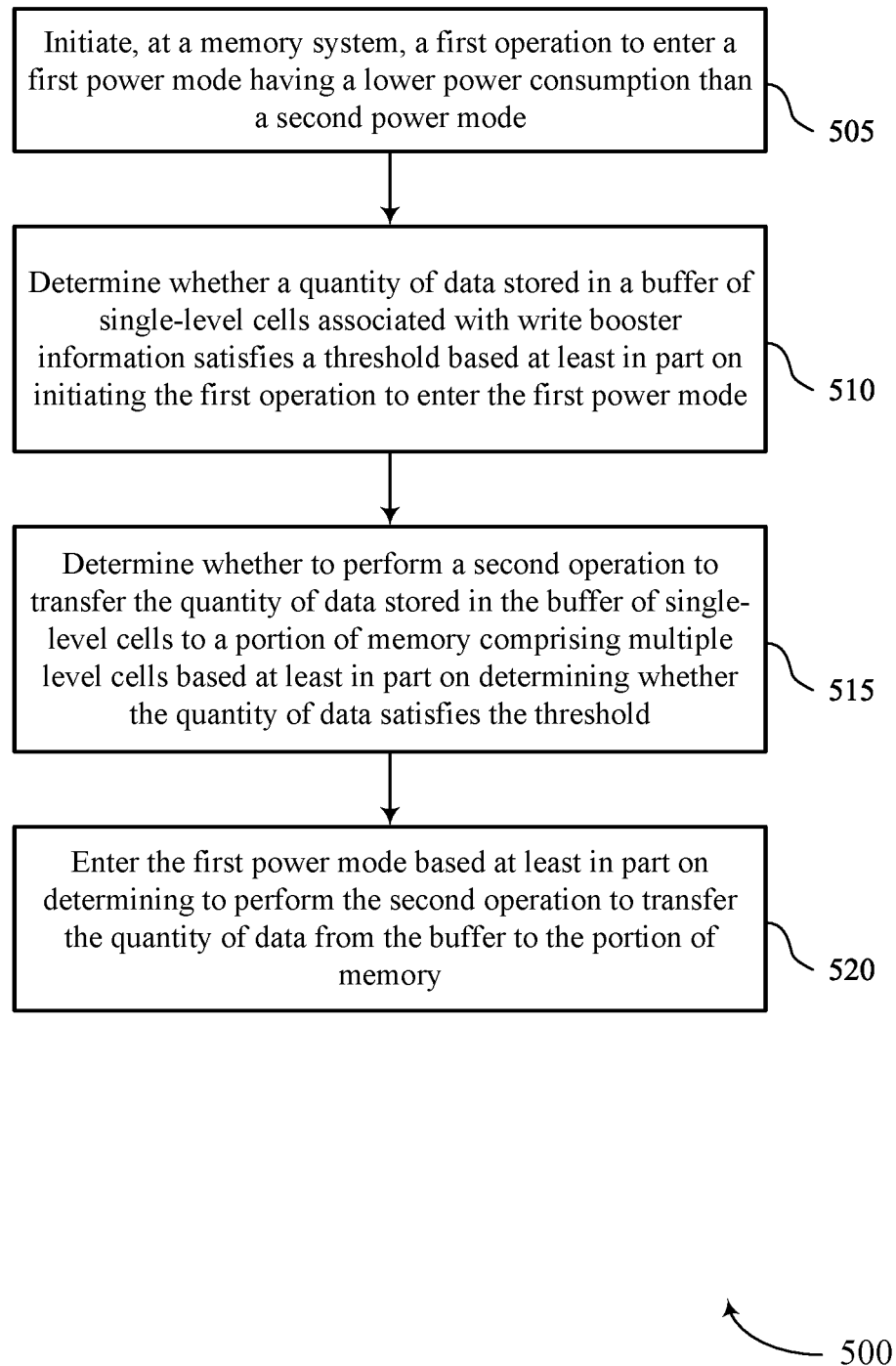
FIG. 5 shows a flowchart illustrating a method or methods that support write booster buffer and hibernate in accordance with examples as disclosed herein.

FIG. 5 shows a flowchart illustrating a method 500 that supports write booster buffer and hibernate in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, a first operation may be initiated. The method may include initiating, at a memory system, a first operation to enter a first power mode having a lower power consumption than a second power mode. The operations of 505 may be performed in accordance with examples as disclosed herein. In some examples, aspects of the operations of 505 may be performed by a request component 425 as described with reference to FIG. 4.

At 510, a determination whether a quantity of data satisfies a threshold may be made. The method may include determining whether a quantity of data stored in a buffer of single-level cells associated with write booster information satisfies a threshold based at least in part on initiating the first operation to enter the first power mode. The operations of 510 may be performed in accordance with examples as disclosed herein. In some examples, aspects of the operations of 510 may be performed by a threshold component 430 as described with reference to FIG. 4.

At 515, a determination whether to perform a second operation may be made. The method may include determining whether to perform a second operation to transfer the quantity of data stored in the buffer of single-level cells to a portion of memory including multiple level cells based at least in part on determining whether the quantity of data satisfies the threshold. The operations of 515 may be performed in accordance with examples as disclosed herein. In some examples, aspects of the operations of 515 may be performed by a flush component 435 as described with reference to FIG. 4.

At 520, the first power mode may be entered. The method may include entering the first power mode based at least in part on determining to perform the second operation to transfer the quantity of data from the buffer to the portion of memory. The operations of 520 may be performed in accordance with examples as disclosed herein. In some examples, aspects of the operations of 520 may be performed by a hibernate component 440 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for initiating, at a memory system, a first operation to enter a first power mode having a lower power consumption than a second power mode; determining whether a quantity of data stored in a buffer of single-level cells associated with write booster information satisfies a threshold based at least in part on initiating the first operation to enter the first power mode; determining whether to perform a second operation to transfer the quantity of data stored in the buffer of single-level cells to a portion of memory including multiple level cells based at least in part on determining whether the quantity of data satisfies the threshold; and entering the first power mode based at least in part on determining to perform the second operation to transfer the quantity of data from the buffer to the portion of memory.

Aspect 2: The apparatus of aspect 1, further including operations, features, circuitry, logic, means, or instructions, or any combination thereof for performing the second operation based at least in part on determining that the quantity of data satisfies the threshold and determining to perform the second operation, where entering the first power mode is based at least in part on performing the second operation.

Aspect 3: The apparatus of any of aspects 1 through 2, further including operations, features, circuitry, logic, means, or instructions, or any combination thereof for entering the first power mode occurs without performing the second operation based at least in part on determining that the quantity of data fails to satisfy the threshold and determining to refrain from performing the second operation.

Aspect 4: The apparatus of any of aspects 1 through 3, further including operations, features, circuitry, logic, means, or instructions, or any combination thereof for determining whether a total bytes written to the memory system satisfies a second threshold, where determining whether the quantity of data satisfies the threshold is based at least in part on determining whether the total bytes written satisfies the second threshold.

Aspect 5: The apparatus of aspect 4, further including operations, features, circuitry, logic, means, or instructions, or any combination thereof for activating, at the memory system, a tracking mode to determine whether to perform the second operation before entering the first power mode, where determining that the quantity of data satisfies the threshold and determining to perform the second operation is based at least in part on activating the tracking mode.

Aspect 6: The apparatus of any of aspects 1 through 5 where determining whether the quantity of data satisfies the threshold, further includes operations, features, circuitry, logic, means, or instructions, or any combination thereof for determining that a percentage of available space of the buffer satisfies the threshold after the initiating occurs.

Aspect 7: The apparatus of aspect 6, further including operations, features, circuitry, logic, means, or instructions, or any combination thereof for adjusting the threshold based at least in part on determining that the percentage of the available space of the buffer is below a second threshold.

Aspect 8: The apparatus of any of aspects 1 through 7, further including operations, features, circuitry, logic, means, or instructions, or any combination thereof for identifying a request to perform a flush operation associated with the memory system based at least in part on initiating the first operation to enter the first power mode.

Aspect 9: The apparatus of any of aspects 1 through 8, further including operations, features, circuitry, logic, means, or instructions, or any combination thereof for refraining from transferring data that was last written to before the memory system entered the first power mode based at least in part on determining that the quantity of data satisfies the threshold.

Aspect 10: The apparatus of any of aspects 1 through 9, further including operations, features, circuitry, logic, means, or instructions, or any combination thereof for the second operation is performed until the quantity of data equals the threshold.

Aspect 11: The apparatus of any of aspects 1 through 10, further including operations, features, circuitry, logic, means, or instructions, or any combination thereof for the first power mode includes a hibernate mode.

Aspect 12: The apparatus of any of aspects 1 through 11, further including operations, features, circuitry, logic, means, or instructions, or any combination thereof for the multiple level cells include multi-level cells configured to store two bits of data, triple-level cell configured to store three bits of data, or quad-level cells configured to store four bits of data.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory system; and
   a controller coupled with the memory system, wherein the controller is configured to cause the apparatus to:
   initiate, at the memory system, a first operation to enter a first power mode having a lower power consumption than a second power mode;
   determine whether a total bytes written to the memory system satisfies a threshold;
   determine whether a quantity of data stored in a buffer of single-level cells associated with write booster information satisfies a second threshold based at least in part on initiating the first operation to enter the first power mode, wherein determining whether the quantity of data satisfies the second threshold is based at least in part on determining whether the total bytes written satisfies the threshold;
   determine whether to perform a second operation to transfer the quantity of data stored in the buffer of single-level cells to a portion of memory comprising multiple level cells based at least in part on determining whether the quantity of data satisfies the second threshold; and
   enter the first power mode based at least in part on determining to perform the second operation to transfer the quantity of data from the buffer to the portion of memory.

2. The apparatus of claim 1, wherein the controller is further configured to cause the apparatus to:
   perform the second operation based at least in part on determining that the quantity of data satisfies the second threshold and determining to perform the second operation, wherein entering the first power mode is based at least in part on performing the second operation.

3. The apparatus of claim 1, wherein entering the first power mode occurs without performing the second operation based at least in part on determining that the quantity of data fails to satisfy the second threshold and determining to refrain from performing the second operation.

4. The apparatus of claim 1, wherein the controller is further configured to cause the apparatus to:
   activate, at the memory system, a tracking mode to determine whether to perform the second operation before entering the first power mode, wherein determining that the quantity of data satisfies the second threshold and determining to perform the second operation is based at least in part on activating the tracking mode.

5. The apparatus of claim 1, determining whether the quantity of data satisfies the second threshold further comprises:
   determining that a percentage of available space of the buffer satisfies the second threshold after the initiating occurs.

6. The apparatus of claim 5, wherein the controller is further configured to cause the apparatus to:

adjust the second threshold based at least in part on determining that the percentage of the available space of the buffer is below a third threshold.

7. The apparatus of claim 1, wherein the controller is further configured to cause the apparatus to:
identify a request to perform a flush operation associated with the memory system based at least in part on initiating the first operation to enter the first power mode.

8. The apparatus of claim 1, further comprises:
refraining from transferring data that was last written to before the memory system entered the first power mode based at least in part on determining that the quantity of data satisfies the second threshold.

9. The apparatus of claim 1, wherein the second operation is performed until the quantity of data equals the second threshold.

10. The apparatus of claim 1, wherein the first power mode comprises a hibernate mode.

11. The apparatus of claim 1, wherein:
the multiple level cells comprise multi-level cells configured to store two bits of data, triple-level cell configured to store three bits of data, or quad-level cells configured to store four bits of data.

12. A non-transitory computer-readable medium storing code, the code comprising instructions executable by a processor to:
initiate, at a memory system, a first operation to enter a first power mode having a lower power consumption than a second power mode;
determine whether a total bytes written to the memory system satisfies a threshold;
determine whether a quantity of data stored in a buffer of single-level cells associated with write booster information satisfies a second threshold based at least in part on initiating the first operation to enter the first power mode, wherein determining whether the quantity of data satisfies the second threshold is based at least in part on determining whether the total bytes written satisfies the threshold;
determine whether to perform a second operation to transfer the quantity of data stored in the buffer of single-level cells to a portion of memory comprising multiple level cells based at least in part on determining whether the quantity of data satisfies the threshold; and
enter the first power mode based at least in part on determining to perform the second operation to transfer the quantity of data from the buffer to the portion of memory.

13. The non-transitory computer-readable medium of claim 12, wherein the instructions are further executable by the processor to:
perform the second operation based at least in part on determining that the quantity of data satisfies the second threshold and determining to perform the second operation, wherein entering the first power mode is based at least in part on performing the second operation.

14. The non-transitory computer-readable medium of claim 12, wherein entering the first power mode occurs without performing the second operation based at least in part on determining that the quantity of data fails to satisfy the second threshold and determining to refrain from performing the second operation.

15. The non-transitory computer-readable medium of claim 12, wherein the instructions are further executable by the processor to:

activate, at the memory system, a tracking mode to determine whether to perform the second operation before entering the first power mode, wherein determining that the quantity of data satisfies the second threshold and determining to perform the second operation is based at least in part on activating the tracking mode.

16. The non-transitory computer-readable medium of claim 12, determining whether the quantity of data satisfies the second threshold further comprises:
determining that a percentage of available space of the buffer satisfies the second threshold after the initiating occurs.

17. The non-transitory computer-readable medium of claim 16, wherein the instructions are further executable by the processor to:
adjust the second threshold based at least in part on determining that the percentage of the available space of the buffer is below a third threshold.

18. A method, comprising:
initiating, at a memory system, a first operation to enter a first power mode having a lower power consumption than a second power mode;
determining whether a total bytes written to the memory system satisfies a threshold;
determining whether a quantity of data stored in a buffer of single-level cells associated with write booster information satisfies a second threshold based at least in part on initiating the first operation to enter the first power mode, wherein determining whether the quantity of data satisfies the second threshold is based at least in part on determining whether the total bytes written satisfies the threshold;
determining whether to perform a second operation to transfer the quantity of data stored in the buffer of single-level cells to a portion of memory comprising multiple level cells based at least in part on determining whether the quantity of data satisfies the second threshold; and
entering the first power mode based at least in part on determining to perform the second operation to transfer the quantity of data from the buffer to the portion of memory.

19. The method of claim 18, further comprising:
performing the second operation based at least in part on determining that the quantity of data satisfies the second threshold and determining to perform the second operation, wherein entering the first power mode is based at least in part on performing the second operation.

20. The method of claim 18, wherein entering the first power mode occurs without performing the second operation based at least in part on determining that the quantity of data fails to satisfy the second threshold and determining to refrain from performing the second operation.

21. The method of claim 18, further comprising:
activating, at the memory system, a tracking mode to determine whether to perform the second operation before entering the first power mode, wherein determining that the quantity of data satisfies the second threshold and determining to perform the second operation is based at least in part on activating the tracking mode.

22. The method of claim 18, determining whether the quantity of data satisfies the second threshold further comprises:

determining that a percentage of available space of the buffer satisfies the second threshold after the initiating occurs.

\* \* \* \* \*